(12) United States Patent
Takayama

(10) Patent No.: US 12,523,742 B2
(45) Date of Patent: Jan. 13, 2026

(54) RADAR DEVICE

(71) Applicant: DENSO CORPORATION, Kariya (JP)

(72) Inventor: Takuya Takayama, Kariya (JP)

(73) Assignee: DENSO CORPORATION, Kariya (JP)

(*) Notice: Subject to any disclaimer, the term of this patent is extended or adjusted under 35 U.S.C. 154(b) by 594 days.

(21) Appl. No.: 18/145,304

(22) Filed: Dec. 22, 2022

(65) Prior Publication Data
US 2023/0131287 A1 Apr. 27, 2023

Related U.S. Application Data

(63) Continuation of application No. PCT/JP2021/022659, filed on Jun. 15, 2021.

(30) Foreign Application Priority Data

Jun. 23, 2020 (JP) ................. 2020-107613

(51) Int. Cl.
G01S 7/35 (2006.01)
G01S 7/02 (2006.01)
(52) U.S. Cl.
CPC ............ G01S 7/354 (2013.01); G01S 7/023 (2013.01); G01S 7/356 (2021.05)
(58) Field of Classification Search
CPC combination set(s) only.
See application file for complete search history.

(56) References Cited

FOREIGN PATENT DOCUMENTS

WO WO-2018142882 A1 * 8/2018 ............ G01S 13/34

OTHER PUBLICATIONS

Umehira et al., A Novel Iterative Inter-Radar Interference Reduction Scheme for Densely Deployed Automotive FMCW Radars, The 19th International Radar Symposium IRS 2018, Jun. 20-22, 2018, Bonn, Germany, 10 pgs.

* cited by examiner

Primary Examiner — Vladimir Magloire
Assistant Examiner — Eric K Hodac
(74) Attorney, Agent, or Firm — Maschoff Brennan

(57) ABSTRACT

A radar device according to one aspect of the present disclosure includes a transmitting antenna, a receiving antenna, a signal acquisition unit, an interference removing unit, a spectrum acquisition unit, a target extraction unit, and a first threshold calculation unit. The interference removing unit is configured to remove an interference signal from the amplitude signal acquired. The interference signal has an amplitude value exceeding a first threshold. The target extraction unit is configured to extract at least one target component exceeding a set second threshold from a frequency spectrum. The first threshold calculation unit is configured to calculate the first threshold using the at least one target component extracted.

10 Claims, 11 Drawing Sheets

RADAR DEVICE

CROSS-REFERENCE TO RELATED APPLICATION

This application is a continuation application of International Application No. PCT/JP2021/022659 filed Jun. 15, 2021 which designated the U.S. and claims priority to Japanese Patent Application No. 2020-107613 filed Jun. 23, 2020, the contents of each of which are incorporated herein by reference.

BACKGROUND

Technical Field

The present disclosure relates to a radar device.

Related Art

Interference signals may be mixed into received signals that are received by a radar device. Following Fast Fourier Transform (FFT) processing of amplitude digital signals on which the interference signals are superimposed, the noise floor of the FFT spectra may rise. Accordingly, target signals may be buried in the noise floor and thus fail to be detected.

DESCRIPTION OF SPECIFIC EMBODIMENTS

Figure 1A:
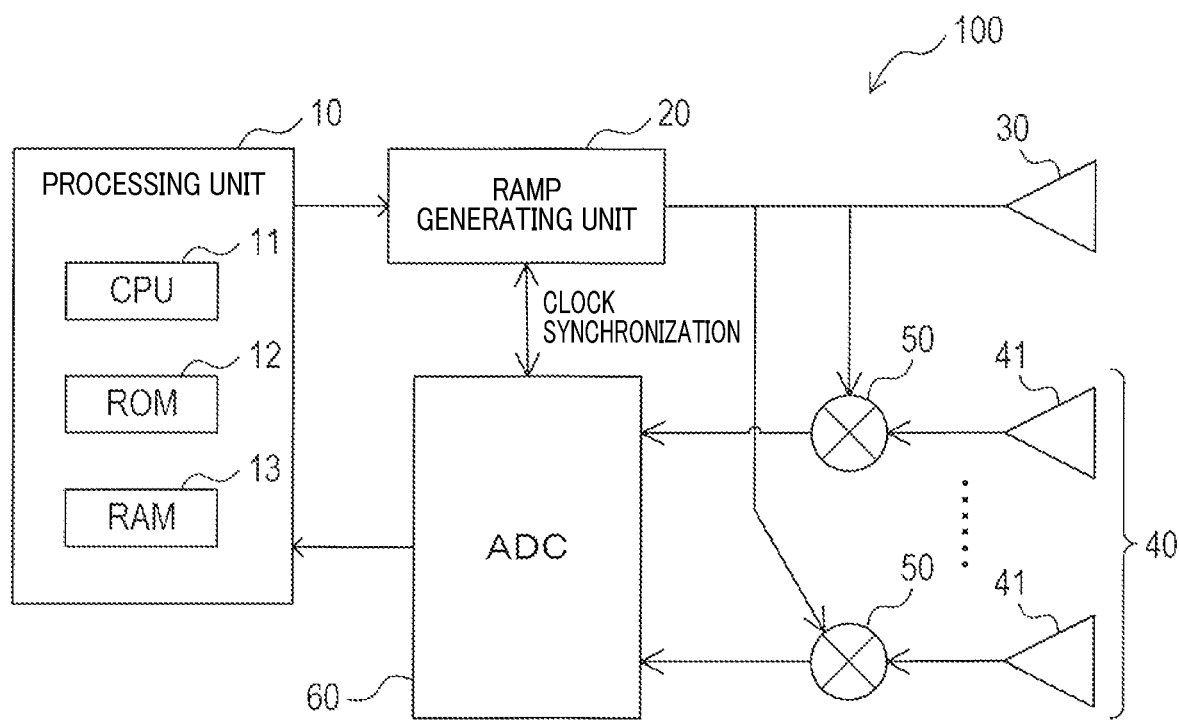
FIG. 1A is a schematic diagram of a configuration of an antenna device according to a first embodiment.

In "A Novel Iterative Inter-Radar Interference Reduction Scheme for Densely Deployed Automotive FMCW Radars" in 2018 19th International Radar Symposium (IRS2018), amplitude values of the amplitude digital signals before FFT processing are compared with a threshold value, and each amplitude digital signal having an amplitude value greater than the threshold value is removed as an interference signal. Such removal suppresses the rise of the noise floor in the FFT spectra.

Setting the above threshold value to a value less than the amplitude values of the target amplitude digital signals may cause distortion of the target signals and generation of harmonics in the FFT spectra.

In view of the foregoing, it is desired to have a radar device capable of removing interference signals from amplitude digital signals by setting an appropriate threshold value.

A radar device according to one aspect of the present disclosure includes a transmitting antenna, a receiving antenna, a signal acquisition unit, an interference removing unit, a spectrum acquisition unit, a target extraction unit, a first threshold calculation unit. The transmitting antenna is configured to transmit a transmission wave every processing cycle. The receiving antenna is configured to receive a reflected wave of the transmission wave. The signal acquisition unit is configured to acquire an amplitude signal corresponding to the reflected wave received by the receiving antenna. The interference removing unit is configured to remove an interference signal from the amplitude signal acquired by the signal acquisition unit and thereby update the amplitude signal. The interference signal has an amplitude value exceeding a first threshold. The spectrum acquisition unit is configured to acquire a frequency spectrum by Fourier transforming the amplitude signal. The target extraction unit is configured to extract at least one target component exceeding a set second threshold from the frequency spectrum acquired by the spectrum acquisition unit. The first threshold calculation unit is configured to calculate the first threshold using the at least one target component extracted by the target extraction unit.

With the radar device according to one aspect of the present disclosure, at least one target component exceeding the second threshold is extracted from the frequency spectrum. In the amplitude signal, the interference signal may be mixed during a localized time period. Therefore, in the amplitude signal, it is relatively not easy to set the first threshold appropriately and extract the target signal from the amplitude signal. Meanwhile, in the frequency spectrum, power of the interference signal is dispersed over the entire frequency range, while power of the target signal is concentrated at a specific beat frequency. Therefore, in the frequency spectrum, it is relatively easy to set the second threshold appropriately and extract the target signal from the frequency spectrum. Hence, in the above radar device, the target component is extracted from the frequency spectrum. From the extracted target component, the amplitude of the target signal included in the amplitude signal can be estimated. That is, from the extracted target component, an appropriate first threshold can be calculated according to the amplitude of the target signal. Therefore, the interference signal can be removed from the amplitude signal using the appropriately set first threshold.

Embodiments of the present disclosure will now be described with reference to the accompanying drawings.

First Embodiment 1-1. Configuration

The configuration of the radar device 100 of the first embodiment will now be described with reference to FIG.

Figure 2:
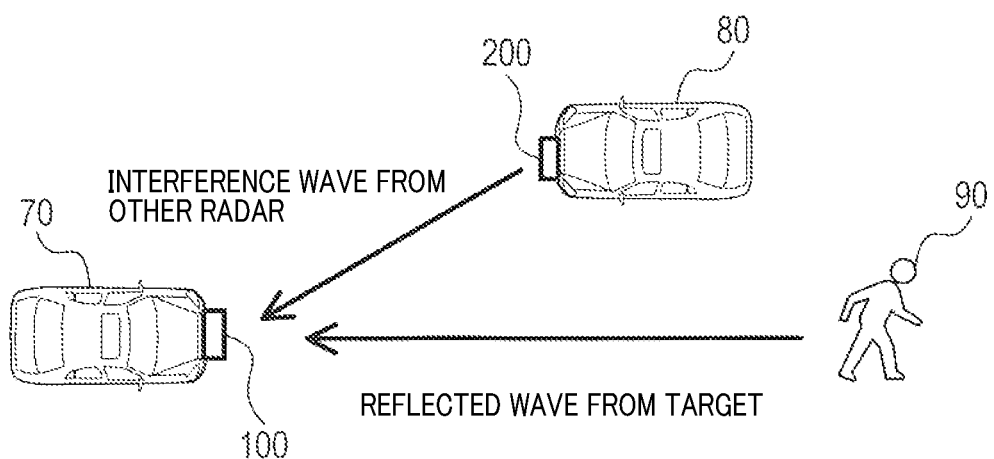
FIG. 2 is an illustration of a situation where interference occurs.

1A. The radar device 100 employs the Frequency Modulated Continuous Wave (hereinafter referred to as FMCW) method. As illustrated in FIG. 2, the radar device 100 is mounted to the lateral center of the front bumper of the vehicle 70.

The radar device 100 includes a processing unit 10, a ramp generating unit 20, a transmitting antenna 30, a receiving antenna 40, K mixers 50, and an analog-to-digital converter (ADC) 60.

The processing unit 10 is configured around a microcomputer including a CPU 11, a ROM 12, a RAM 13, and an I/O interface. The processing unit 10 generates a frequency control signal and transmits the generated frequency control signal to the ramp generating unit 20. The frequency control signal sets a frequency of a transmission signal. The ramp generating unit 20 generates a radar signal according to the frequency control signal received from the processing unit 10 and transmits the generated radar signal to the transmitting antenna 30. The ramp generating unit 20 also supplies the generated radar signal to each of the K mixers 50.

The transmitting antenna 30 emits a chirp-modulated transmission wave according to the radar signal received from the ramp generating unit 20. Specifically, as indicated by the solid line in FIG. 3, the transmitting antenna 30 repeatedly transmits the transmission wave whose frequency changes monotonically from fc to fc+F in a modulation time Tc repeatedly every processing cycle.

The receiving antenna 40 includes K (K being an integer greater than or equal to 2) receiving antenna elements 41 arranged in a predefined direction. Each receiving antenna element 41 receives a reflected wave of the radar wave from a target and supplies the reflected signal to the corresponding mixer 50.

K mixers 50 are provided, one for each receiving antenna element 41. Each mixer 50 mixes the radar signal supplied from the ramp generating unit 20 and the reflected signal supplied from the receiving antenna element 41 to generate a beat signal. The beat signal has as its frequency component a difference in frequency between the radar signal and the reflected signal. The difference in frequency between the radar signal and the reflected signal corresponds to a beat frequency. Each of the 50 mixers transmits the generated beat signal to the ADC 60.

The ADC 60 samples respective ones of the beat signals transmitted via K channels from the K mixers 50 to generate amplitude digital signals (hereinafter referred to as AD signals), and transmits the generated AD signals for the K channels to the processing unit 10. Specifically, the ADC 60 is clock-synchronized with the ramp generating unit 20. Every processing cycle, the ADC 60 starts sampling of the beat signals after a certain time offset from the start of transmission of the transmission wave, and continues sampling for a certain time interval.

Figure 1B:
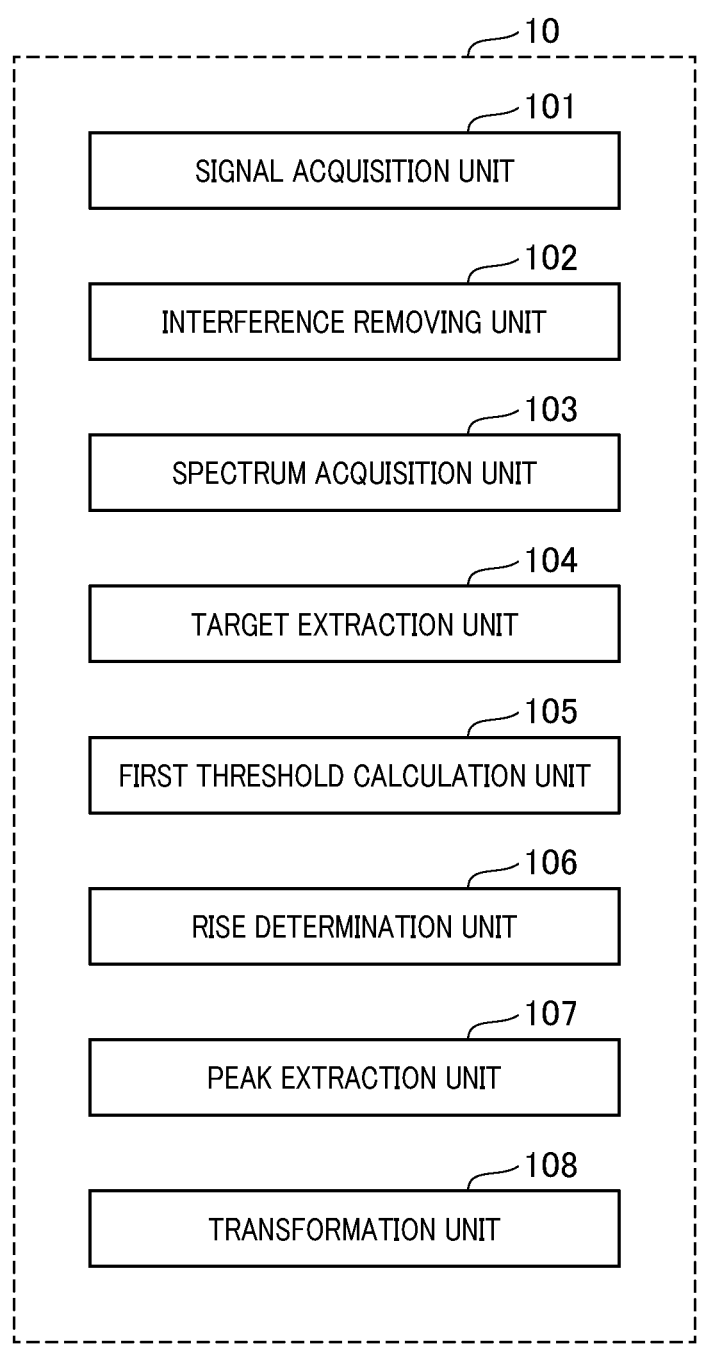
FIG. 1B is a functional block diagram of a processing unit.

The processing unit 10 performs signal processing, such as frequency analysis, on the AD signals for the K channels acquired from the ADC 60. As illustrated in FIG. 1B, the processing unit 10 implements functions of a signal acquisition unit 101 responsible for execution of step S10 of the signal processing described later (see FIG. 10), an interference removing unit 102 responsible for execution of step S30 of the signal processing, a spectrum acquisition unit 103 responsible for execution of step S40 of the signal processing, a target extraction unit 104 responsible for execution of step S80 of the signal processing, a first threshold calculation unit 105 responsible for execution of step S100 of the signal processing, a rise determination unit 106 responsible for execution of step S50 of the signal processing, a peak extraction unit 107 responsible for execution of step S80 of the signal processing, and a transformation unit 108 responsible for execution of step S100 of the signal processing, by the CPU 11 loading and executing program codes stored in a non-transitory tangible storage medium, such as the ROM 12. A method of implementing these functions is not limited to software, and some or all of the functions may be implemented by hardware in which a logic circuit, an analog circuit, and the like are combined.

1-2. Removal of Interference Signals

Removal of interference signals will now be described with reference to FIGS. 2 to 9. As illustrated in FIG. 2, interference may occur in situations where another vehicle 80 is present near the vehicle 70. The other vehicle 80, like the vehicle 70, has a radar device 200 mounted to the center of the front bumper. The radar device 200 may be the same type of radar device as the radar device 100 or a different radar device. A pedestrian 90 is a target to be detected by the radar device 100, that is, a target of the radar device 100.

The radar device 100 transmits a transmission wave and receives a reflected wave from the pedestrian 90. The reflected wave is generated when the transmission wave is reflected by the pedestrian 90. The radar device 100 also receives a transmission wave transmitted from the radar device 200. The transmission wave transmitted from radar device 200 serves as an interference wave with the reflected wave from the target.

Figure 3:
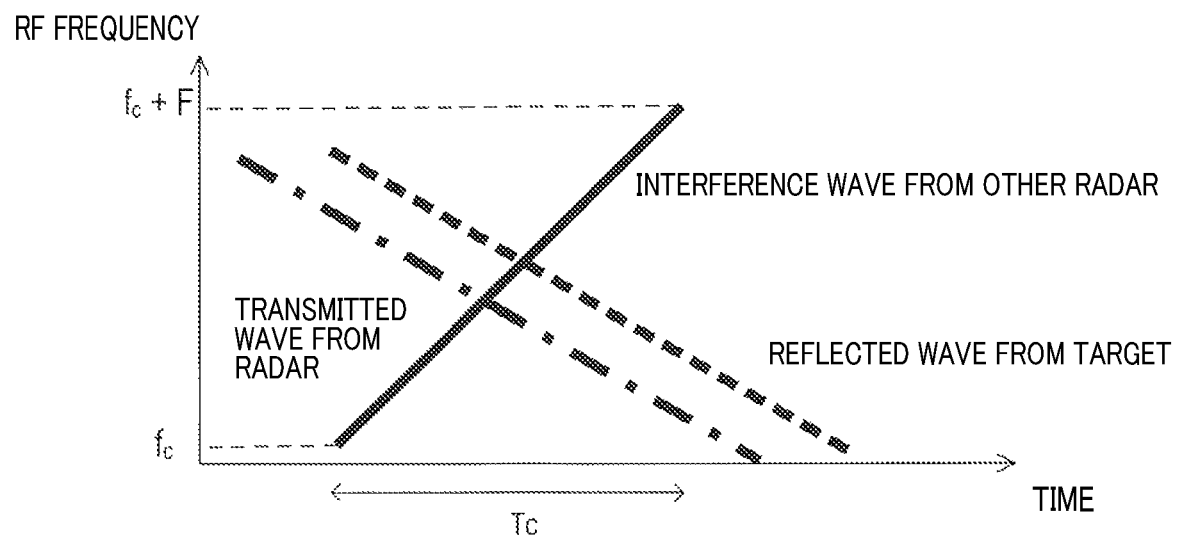
FIG. 3 is an illustration of frequency variations of transmitted, reflected, and interference waves with time.
Figure 4:
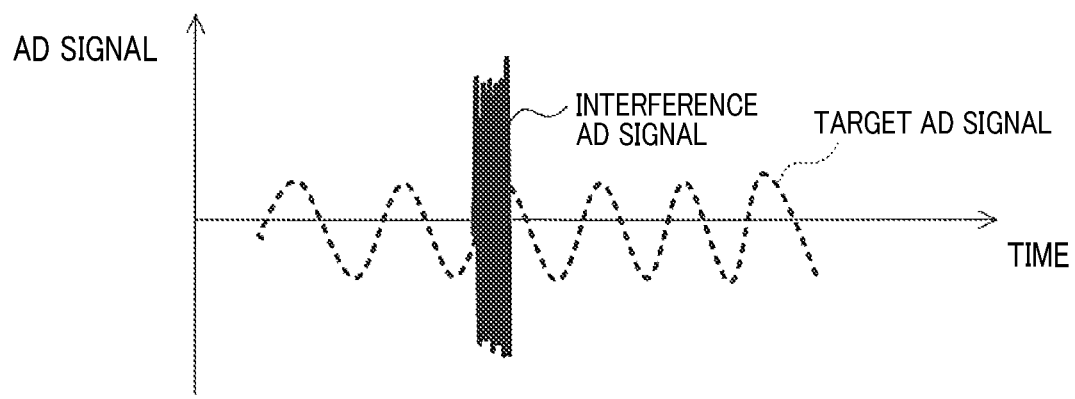
FIG. 4 is an illustration of a target AD signal and an interference AD signal over time.

As illustrated in FIG. 3, the slope of the interference wave from the radar device 200 is often not the same as the slope of the transmission wave from the radar device 100, and a time period during which the frequency of the interference wave crosses the frequency of the transmission wave is limited. Thus, as illustrated in FIG. 4, the time period during which the interference wave is superimposed on the reflected wave is a relatively narrow period during which the frequency of the interference wave intersects the frequency of the transmission wave. The reflected wave from the target attenuates depending on a round-trip distance between the radar device 100 and the target. On the other hand, the interference wave attenuates depending on a one-way distance between the radar device 200 and the radar device 100. Therefore, as illustrated in FIG. 4, an amplitude of an AD signal based on the interference wave (hereinafter referred to as an interference AD signal) is significantly greater than an amplitude of an AD signal based on the reflected wave from the target (hereinafter referred to as a target AD signal).

Applying the Fast Fourier Transform (hereinafter referred to as FFT) to an AD signal including the interference AD signal and the target AD signal allows a FFT signal including an interference component based on the interference AD signal and a target component based on the target AD signal to be calculated. As illustrated in FIG. 4, power of the interference component is dispersed over the entire frequency range. On the other hand, power of the target component is concentrated at the beat frequency.

Figure 5:
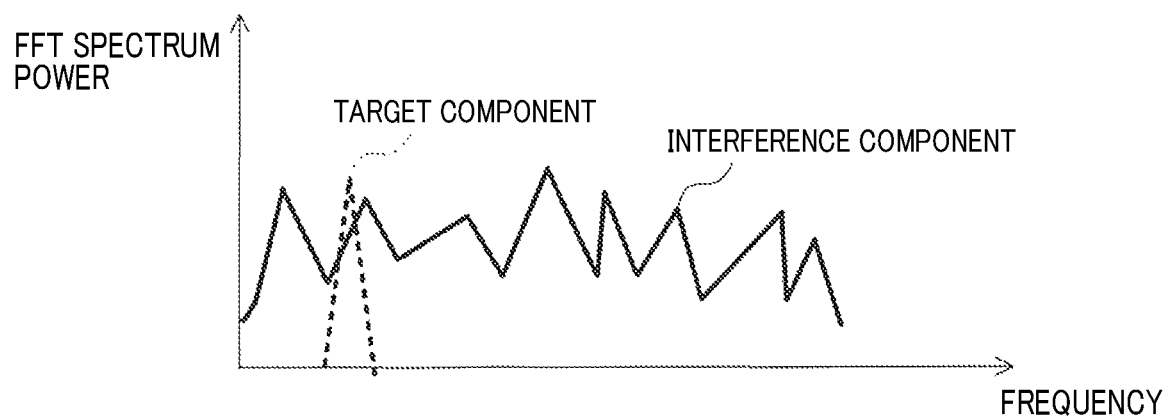
FIG. 5 is an illustration of target and interference components in an FFT spectrum.

As illustrated in FIG. 5, as the power of the interference signal is high, noise power increases over the entire frequency range, as if the noise floor has risen in the FFT spectrum. This may result in the target component being buried in noise and thus undetectable.

Therefore, a method has been proposed to remove the interference AD signal from the AD signal before FFT processing to suppress the rise of noise floor in the FFT spectrum. Specifically, in the above method, the amplitude of the AD signal is compared with a first threshold, and the component of the AD signal with an amplitude value exceeding the first threshold is determined to be an interference AD signal and removed from the AD signal.

Figure 6:
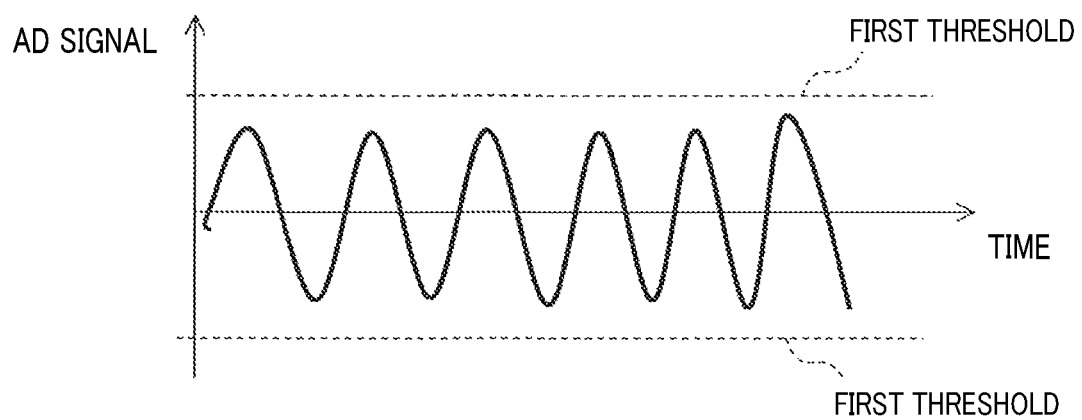
FIG. 6 is an illustration of a target AD signal and a first threshold set appropriately for interference removal.
Figure 7:
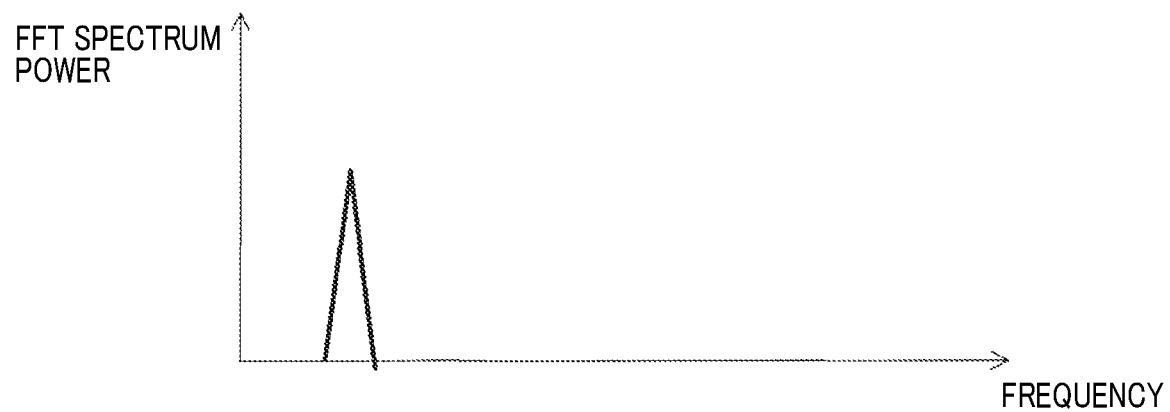
FIG. 7 is an illustration of a target component in the FFT spectrum after interference removal using the first threshold value set appropriately.

With the first threshold set to a value greater than the amplitude value of the target AD signal, as illustrated in FIG. 6, the target component is calculated appropriately, as illustrated in FIG. 7. However, with the first threshold set to an excessively large value, it may not be possible to remove the interference AD signal from the AD signal.

Figure 8:
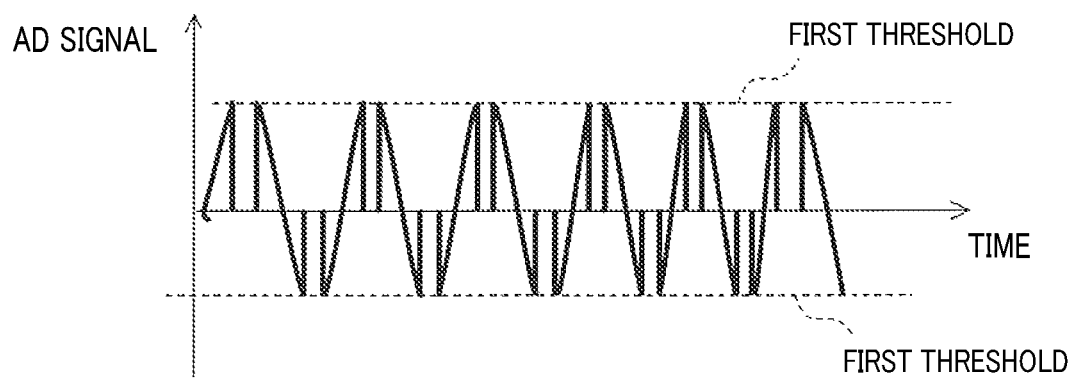
FIG. 8 is an illustration of a target AD signal and a first threshold set inappropriately for interference removal.
Figure 9:
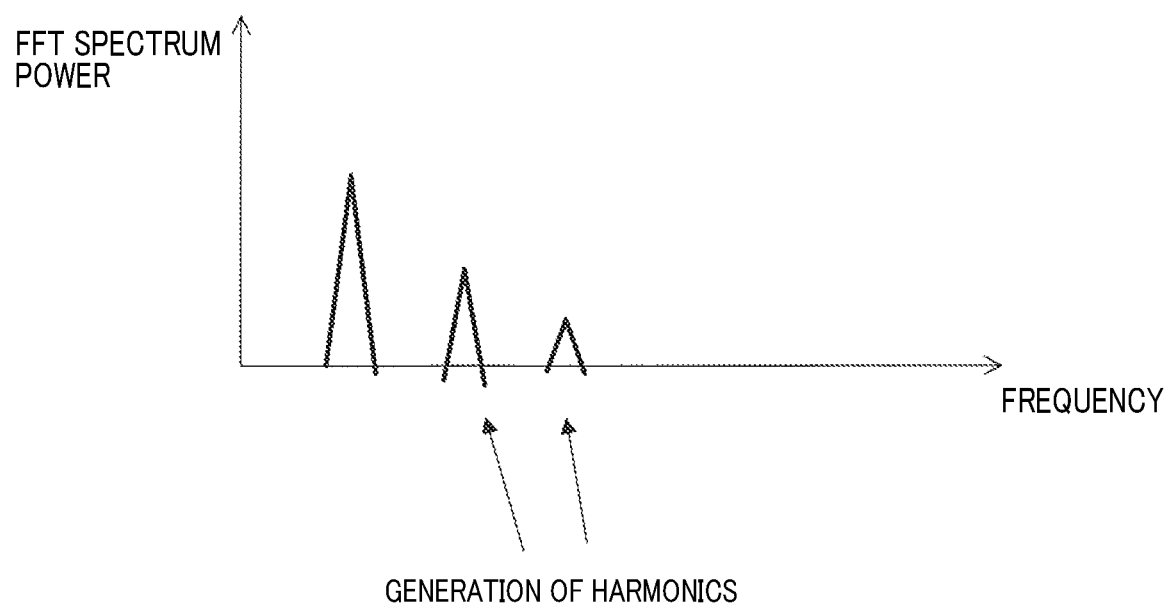
FIG. 9 is an illustration of target components in the FFT spectrum after interference removal using the first threshold value set inappropriately.

On the other hand, as illustrated in FIG. 8, with the first threshold set to a value less than the amplitude value of the target AD signal, a portion of the target AD signal is removed along with the interference AD signal, causing the target AD signal to be distorted. As a result, as illustrated in FIG. 9, the target components include harmonic components.

Therefore, it would be desirable that the first threshold be set appropriately according to the amplitude value of the target AD signal. However, to estimate the amplitude value of the target AD signal from the AD signal, it is necessary to store the AD signals for one processing cycle in the memory. Usually, the AD signals for one processing cycle are not stored in the memory, which gives rise to a need for increasing the memory capacity. On the other hand, usually, the FFT signal after FFT processing is stored in the memory. Therefore, estimating the amplitude value of the target AD signal using the FFT signal does not require an increase in memory.

Therefore, in the present embodiment, at least one target component is extracted from the FFT signal, and the first threshold is set using the extracted at least one target component. That is, the amplitude value of the target AD signal corresponding to the extracted at least one target component is estimated, and the first threshold is set based on the estimated amplitude value of the target AD signal. Details about setting the first threshold are described later.

1-3. Signal Processing

Figure 10:
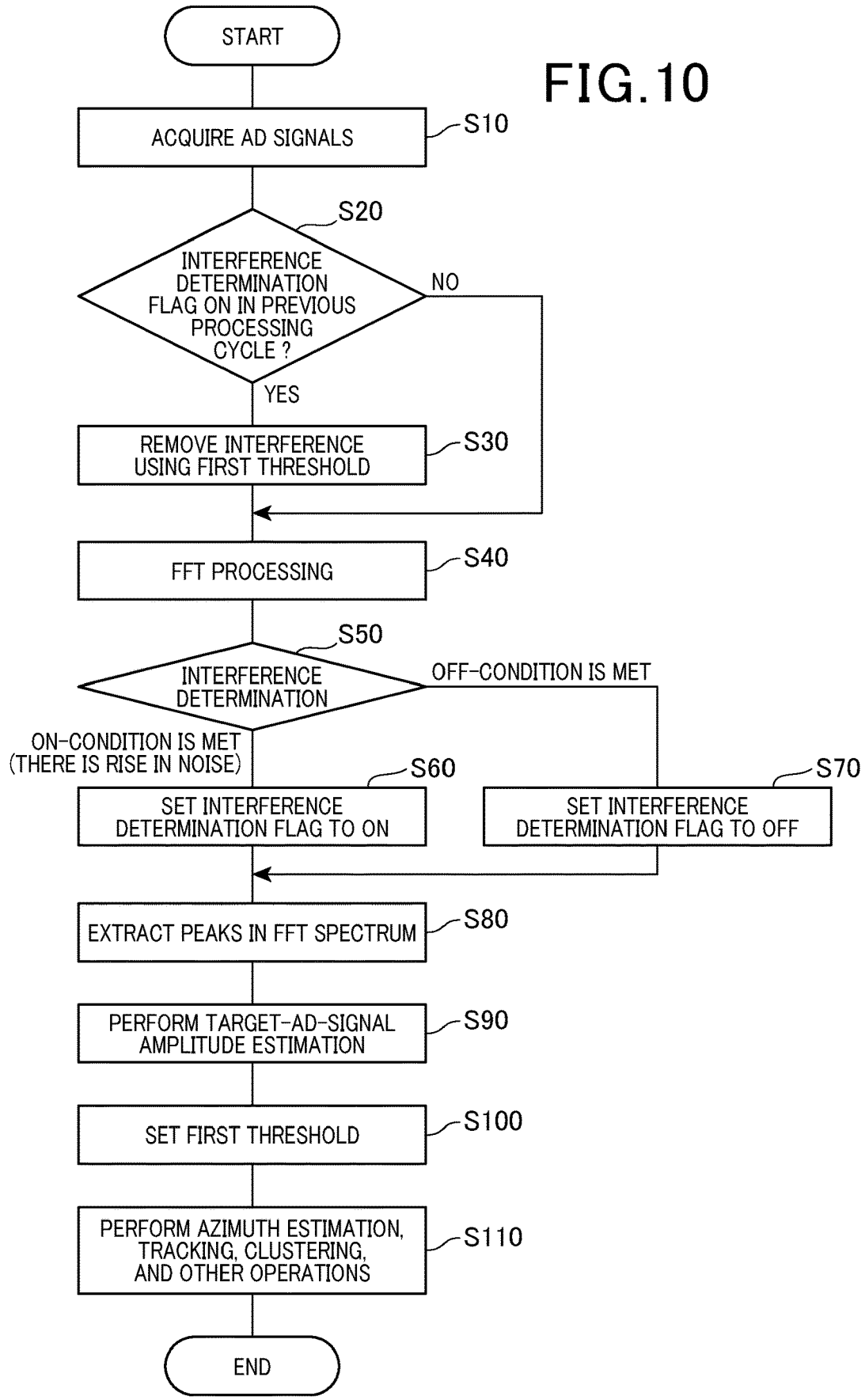
FIG. 10 is a flowchart of signal processing according to the first embodiment.

Signal processing performed by the processing unit 10 will now be described with reference to the flowchart in FIG. 10. The processing unit 10 performs this signal processing repeatedly at predefined time intervals.

At S10, the processing unit 10 acquires AD signals for K channels from the ADC 60.

Then, at S20, the processing unit 10 determines whether an interference determination flag was ON in the immediately previous processing cycle. In the present embodiment, as described later, the presence or absence of interference is determined based on the FFT signal. Therefore, a determination result in the immediately previous processing cycle is used. It can be assumed that the interference situation does not change abruptly between successive processing cycles. If it is determined at S20 that the interference determination flag was ON, the process flow proceeds to S30.

At S30, the processing unit 10 removes interference AD signals from the AD signals using the first threshold set in the immediately previous processing cycle. The first threshold is a positive value. Specifically, as shown in the following conditional expression (1), the amplitude value of each of sampling signals included in each AD signal is compared with the first threshold, and sampling signals having an amplitude value exceeding the first threshold are removed from the AD signal. Here, m is a sample number, n is a chirp number indicating which chirp wave number among a plurality of chirp waves transmitted in each processing cycle, ch is a reception channel number between 0 and K-1, ad(m, n, ch) is the AD signal, Th1(ch) is the first threshold, and ad_ej(m, n, ch) indicates the updated AD signal having interference removed. The first threshold Th1(ch) is set for each reception channel in the processing described later.

As shown in the conditional expression (1), each AD signal is updated by adding a sampling signal with an amplitude value equal to the first threshold Th1(ch) in place of a sampling signal with an amplitude value exceeding the first threshold Th1(ch) in the AD signal. That is, in each AD signal, the amplitude value is clipped to the first threshold Th1(ch) during periods when the amplitude value is greater than the first threshold Th1(1), and the amplitude value is clipped to the first threshold Th1(ch)×(−1) during periods when the amplitude value is less than the first threshold Th1(ch). Thereafter, the process flow proceeds to S40.

if ad(m,n,ch)>Th1(ch) ad_rej(m,n,ch)=Th1(ch)

else if ad(m,n,ch)<Th1(ch) ad_rej(m,n,ch)=(−1)*Th1(ch)

else ad_rej(m,n,ch)=ad(m,n,ch)  (1)

Alternatively, as shown in the conditional expression (2), the amplitude value of each sampling signal included in each AD signal is compared with the first threshold Th1(ch), and sampling signals having an amplitude value exceeding the first threshold Th1(ch) are removed. Furthermore, in each AD signal, as shown in the conditional expression (2), a sampling signal having an amplitude value of 0 is added in place of each sampling signal having an amplitude value exceeding the first threshold Th1(ch). That is, each AD signal is filled with 0 during periods in which the amplitude is greater than the first threshold value.

If abs(ad(m,n,ch))>Th1(ch) ad_rej(m,n,ch)=0 else ad_rej(m,n,ch)=ad(m,n,ch)  (2)

0-filling is more effective in suppressing interference than clipping, but may give rise to larger harmonic components in the event where the target AD signal is mistakenly removed. Therefore, according to whether the interference suppression effect or suppression of harmonic components is more important, either 0-filling or clipping may be selected as appropriate.

If it is determined in S20 that the interference determination flag was OFF, the process flow skips S30 and proceeds to S40. This can reduce the possibility of distorting the target AD signals by avoiding performing unnecessary interference removal processing in an interference-free environment.

At S40, the processing unit 10 performs FFT processing on the AD signal for each reception channel and calculates the FFT signal. If interference removal processing was performed at S30, the processing unit 10 performs FFT processing on the AD signal updated at S30 for each reception channel. If interference removal processing was not performed at S30, the processing unit 10 performs FFT processing on the AD signal acquired at S10 for each reception channel. Specifically, the processing unit 10 performs a two-dimensional Fourier transform of the AD signal for each reception channel using the following equation (3). If interference removal processing was not performed at S30, the processing unit 10 sets ad_rej(m, n, ch) in the equation (3) to ad(m, n, ch). p is a distance bin number between 0 and M-1, q is a velocity bin number between 0 and N-1, fft(p, q, ch) is the FFT signal, and wind(m, n) is a window function. M and N are integers greater than or equal to 2.

$$fft(p,q,ch) = \sum_{p=0}^{M-1} \sum_{q=0}^{N-1} \text{wind}(m,n) * \text{ad\_rej}(m,n,ch) * e^{-j\frac{2\pi p}{M}m} * e^{-j\frac{2\pi q}{N}n} \quad (3)$$

At S50, the processing unit 10 performs interference determination. Specifically, the following expressions (4) to (7) are used to determine whether there is a rise in noise power. First, total power pow_ch_sum(p, q) that is a sum of power of the FFT signals fft(p, q, ch) for the reception channels is calculated using the equation (4).

$$\text{pow\_ch\_sum}(p,q) = \Sigma \text{abs}(f\,f\,t(p\_,q,ch))^2 \quad (4)$$

Subsequently, median power pow_median of the total power pow_ch_sum(p, q) is calculated using the equation (5).

$$\text{pow\_median} = 10 * \log 10(\text{pow\_ch\_sum}(p,q)) \quad (5)$$

The processing unit 10 then calculates the minimum power pow_min_hold of the median power pow_median over X1 processing cycles prior to the current processing cycle. X1 may be set to 100, for example. The minimum power pow_min_hold corresponds to thermal noise of the radar device 100, more specifically, thermal noise in the receiving path from the receiving antenna 40 to the processing unit 10. Because interference is not always observed every processing cycle, the median power pow_median for the respective processing cycles over a long time period includes the median power pow_median on which interference is not superimposed. The median power pow_median without superimposed interference is lower than the median power pow_median with superimposed interference. Therefore, the thermal noise of the radar device 100 may be calculated by selecting the minimum power pow_min_hold from the median power pow_median for the processing cycles over a long time period.

Then, the processing unit 10 determines whether an interference determination ON condition or an interference determination OFF condition is met. Specifically, the interference determination ON condition is determined to be met when the inequality (6) is satisfied Y times during the X2 processing cycles prior to the current processing cycle. X2 is, for example, 10, Y is, for example, 5, and pow_thre is, for example, 10 dB.

That is, if a difference between the median power pow_median and the minimum power pow_min_hold is greater than pow_thre at least Y times during X2 processing cycles, the interference determination ON condition is determined to be met. Then, it is determined that there is a rise in noise power due to interference. If the interference determination ON condition is determined to be met, the process flow proceeds to S60, where the interference determination flag is set to ON, and the process flow proceeds to S80.

$$\text{pow\_median} > \text{pow\_min\_hold} + \text{pow\_thre} \quad (6)$$

If the inequality (7) is satisfied for X3 consecutive processing cycles prior to the current processing cycle, the interference determination OFF condition is determined to be met. X3 is 5, for example. That is, the interference determination OFF condition is met if a difference between the median power pow_median and the minimum power pow_min_hold is less than pow_thre for at least X consecutive 3 processing cycles. Then, it is determined that there is no rise in noise power due to interference. If the interference determination OFF condition is determined to be met, the process flow proceeds to S70, where the processing unit 10 sets the interference determination flag to OFF, and the process flow proceeds to S80.

$$\text{pow\_median} < \text{pow\_min\_hold} + \text{pow\_thre} \quad (7)$$

At S80, the processing unit 10 extracts at least one target component from the FFT spectrum calculated at S40 for each reception channel, and extracts a peak component from each of the extracted target components. Specifically, using the following inequality (8), the processing unit 10 searches for a pair of distance bin number p and velocity bin number q for which total power pow_ch_sum(p, q) is higher than a second threshold value Th2 as a target component from the FFT spectrum. That is, a pair of bins (p, q) that satisfy the inequality (8) are searched. The second threshold Th2 is calculated, for example, by adding a predefined value to the median power pow_median. The predefined value is, for example, 5 dB.

$$\text{pow\_ch\_sum}(p,q) > \text{Th2} \quad (8)$$

Since an interference AD signal is often observed over a short period of time, the interference component corresponding to the interference AD signal is widely spread over the entire frequency range of the FFT spectrum. Therefore, the interference component almost never exceeds the second threshold value Th2 in the FFT spectrum. Even if the interference component exceeds the second threshold, estimation of amplitude of the target AD signal, which is discussed later, is not significantly affected because only a portion of power of the interference component exceeds the second threshold.

On the other hand, the target component corresponding to the target AD signal is distributed only near the beat frequency of the FFT spectrum. Therefore, power of the target component exceeds the second threshold Th2. Therefore, the target detection accuracy is higher when the target component is separated from the FFT signal than when the target AD signal is separated from the AD signals.

Subsequently, the processing unit 10 searches for a pair of bins (p, q) having local maximum power as a peak component from the extracted pairs of bins (p, q), which are target components, using the following inequalities (9). That is, the processing unit 10 searches for a pair of bins (p, q) that satisfy all of the following inequalities (9).

$$\text{pow\_ch\_sum}(p,q) >= \text{pow\_ch\_sum}(p-1,q)$$

$$\text{pow\_ch\_sum}(p,q) >= \text{pow\_ch\_sum}(p,q-1)$$

$$\text{pow\_ch\_sum}(p,q) > \text{pow\_ch\_sum}(p+1,q)$$

$$\text{pow\_ch\_sum}(p,q) > \text{pow\_ch\_sum}(p,q+1) \quad (9)$$

The peak extraction processing at S80 is part of the signal processing in a typical radar device and is not additional processing for interference removal. Therefore, performance of the peak extraction processing does not increase the processing time.

Figure 11:
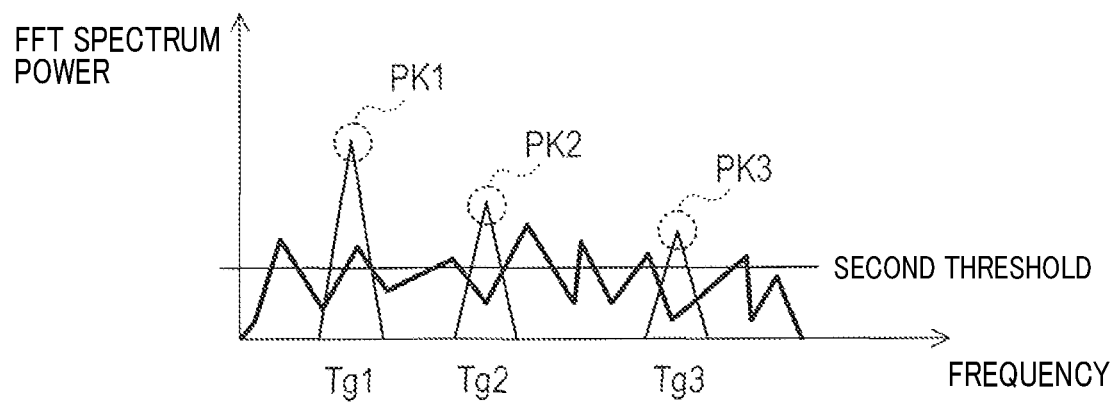
FIG. 11 is an illustration of a target-signal amplitude estimation method according to the first embodiment.
Figure 13:
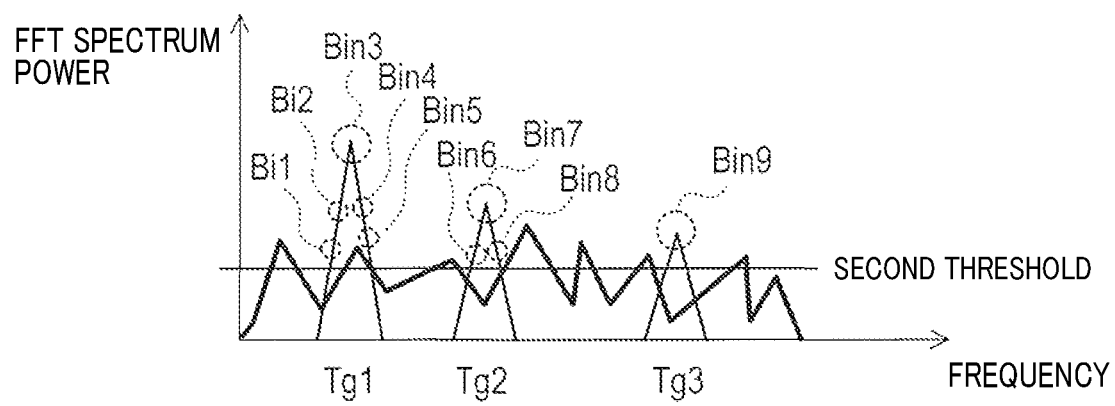
FIG. 13 is an illustration of a target-signal amplitude estimation method according to a second embodiment.
Figure 14:
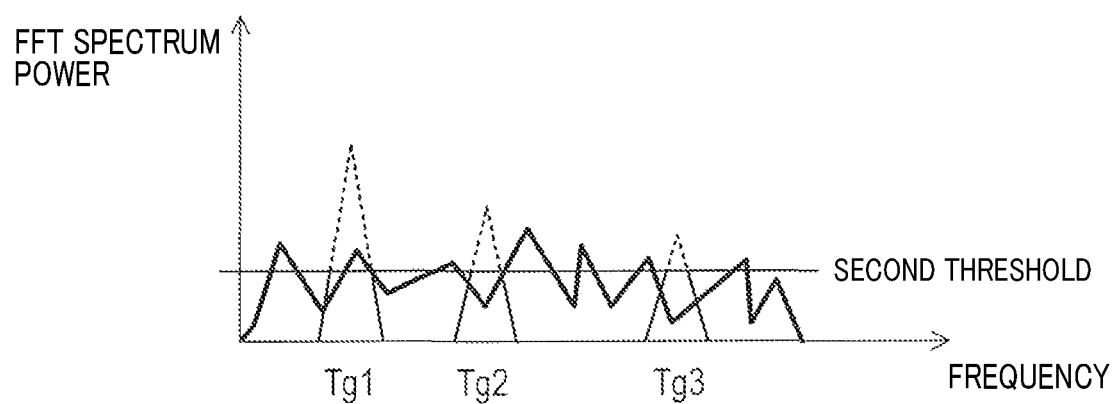
FIG. 14 is an illustration of a target-signal amplitude estimation method according to a fourth embodiment.

Subsequently, at S90, the processing unit 10 estimates the amplitude value of the target AD signal for each reception channel. Specifically, the processing unit 10 calculates the amplitude value of the AD signal corresponding to a superimposed signal as the amplitude estimate amp_est(ch), using the following equation (10). The superimposed signal is a signal acquired by superimposing the FFT signals included in a plurality of peak components extracted at S80 in phase. The initial value of the amplitude estimate amp_est(ch) is set to 0, and amp_est(ch) is updated a specific number of times, where the specific number is the number of peaks extracted at S80. As illustrated in FIG. 11, the processing unit 10 updates the amplitude estimate amp_est(ch) three times, for example, in a case where there are three peaks PK1, PK2, and PK3 extracted. p_peak and q_peak indicate the velocity bin number and the distance bin number that satisfy the inequalities (8) and (9). In FIGS. 11, 13, and 14, Tg1, Tg2, and Tg3 represent target components.

$$\text{amp\_est(ch)} += \text{abs}(f\ t(p\_peak, q\_peak, ch))/(MN) \tag{10}$$

Figure 12:
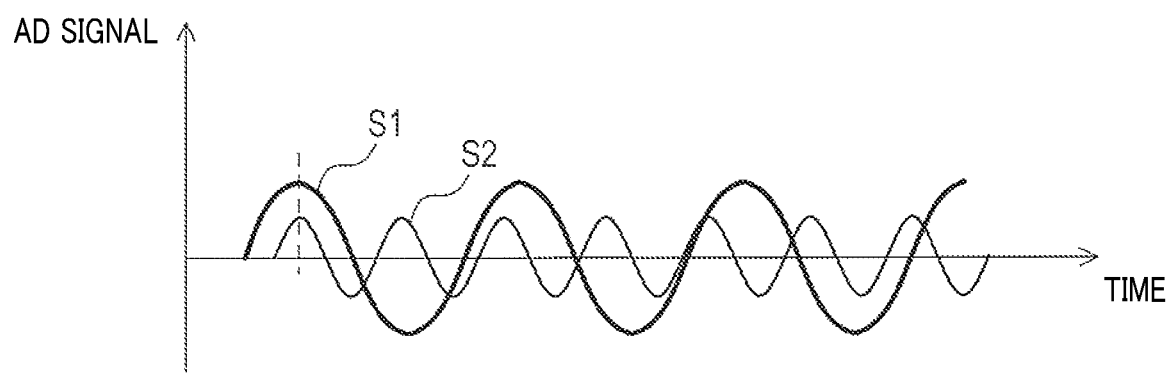
FIG. 12 is an illustration of a maximum amplitude of a target signal according to the first embodiment.

As illustrated in FIG. 12, assuming that the target AD signal includes the first AD signal S1 and the second AD signal S2, the amplitude value of the target AD signal becomes maximum when a peak of the first AD signal S1 and a peak of the second AD signal S2 overlap. That is, the amplitude value of the AD signal corresponding to a superimposed signal acquired by superimposing a plurality of peak components included in the target components in phase corresponds to the maximum amplitude value that the target AD signal can take. At S90, the processing unit 10 calculates the amplitude estimate amp_est(ch) as the maximum amplitude value that the target AD signal can take.

Subsequently, at S100, the processing unit 10 calculates the first threshold value Th(ch) by multiplying the amplitude estimate amp_est(ch) calculated at S90 by a coefficient coef for each reception channel, as shown in the equation (11). The coefficient coef is a value greater than or equal to 1. Although the larger the value of the coefficient coef, the less effective the interference suppression, the target signal is less likely to be removed incorrectly. The value of the coefficient coef may be set to a value that is greater than or ewual to 1 as appropriate.

$$\text{Th1(ch)} = \text{coef} * \text{amp\_est(ch)} \tag{11}$$

At S110, the processing unit 10 uses the peak components extracted at S80 to perform operations to assist driving of the vehicle 70. Specifically, operations, such as azimuth estimation, tracking, and clustering for a target or targets, are performed. The process flows then ends.

1-4. Advantages

The first embodiment set forth above can provide the following advantages.

(1) At least one target component exceeding the second threshold Th2 is extracted from the FFT spectrum. The amplitude value of the target AD signal is estimated from the extracted target component. Further, the first threshold value Th1(ch) is calculated from the estimated amplitude value. The calculated first threshold value Th1(ch) is used to remove interference AD signals from the AD signal. This enables removal of the interference AD signals from the AD signal using the appropriately set first threshold value Th1 (ch).

(2) In a configuration where interference signals are removed using the first threshold Th1(ch) calculated in the current processing cycle, it is necessary to store the AD signal in a memory. After calculating the first threshold value Th1(ch) in the current processing cycle, it is necessary to remove interference signals from the AD signal stored in the memory and calculate the FFT spectrum again from the AD signal having the interference signals removed. This increases the required memory capacity and the processing time for each processing cycle. By contrast, using the first threshold Th1(ch) calculated in the allows the required memory capacity to be suppressed and allows the processing time for each processing cycle to be suppressed.

(3) In each processing cycle, the presence or absence of a rise in noise power is determined, and only when it is determined that there is a rise in noise power, processing of removing interference AD signals from the AD signal is performed. This can lower the risk of distorting the target AD signals.

(4) Removing interference AD signals from the AD signal when it is determined in the previous cycle that there is a rise in noise power allows the processing time to be suppressed in each processing cycle.

(5) Performing clipping in removal of interference signals can suppress harmonic components in the event that the target AD signals are removed incorrectly.

(6) Superimposing a plurality of peak components in phase allows the maximum amplitude value that the AD signal can take to be calculated as the amplitude estimate amp_est(ch). Calculating the first threshold value Th1(ch) based on the calculated amplitude estimate amp_est(ch) can suppress the possibility of removing the target AD signal incorrectly.

Second Embodiment 2-1. Differences from First Embodiment

A second embodiment is similar in basic configuration to the first embodiment. Therefore, differences from the first embodiment will mainly be described below with description regarding common part of the configuration omitted. The same elements as in the first embodiment are assigned the same reference numbers and reference can be made to the preceding description.

In the first embodiment described above, at S90, the processing unit 10 estimates the amplitude value of the target AD signal from the plurality of peak components. In the second embodiment, the second embodiment is different from the first embodiment in that at S90, the processor 10 estimates the amplitude value of the target AD signal using all FFT signals included in a plurality of target components, not just the plurality of peak components.

2-2. Target-AD-Signal Amplitude Estimation

Estimation processing for estimating the amplitude value of the target AD signal performed by the processing unit 10 in the second embodiment will now be described. In the second embodiment, the processing unit 10 calculates, using the equation (12), the amplitude value of the AD signal corresponding to a superimposed signal of the FFT signals at a plurality of pairs of bins (p, q) satisfying the equation (8), that is, the FFT signals included in a plurality of target components, superposed in phase, as the amplitude estimate amp_est(ch). The initial value of the amplitude estimate amp_est(ch) is set to 0, and the amplitude estimate amp_est (ch) is updated a specific number of times, where the specific number is the number of pairs of bins (p, q) that satisfy the equation (8). p_above and q_above indicate the velocity bin number and the distance bin number that satisfy the equation (8).

As illustrated in FIG. 13, in a case where there are nine pairs of bins, Bin 1 to Bin 9, included in the target components, the amplitude estimate amp_est(ch) is updated nine times. The nine pairs of bins, Bin 1 to Bin 9, include three pairs of bins Bin 3, Bin 7, and Bin 9 corresponding to the peaks.

$$\text{amp\_est(ch)} += \text{abs}(f\ ft\_(p\_above, q\_above, ch))/(MN) \tag{12}$$

2-3. Advantages

The second embodiment described above can provide similar advantages to the advantages (1) through (6) of the first embodiment.

Third Embodiment

3-1. Differences from First Embodiment

A third embodiment is similar in basic configuration to the first embodiment. Therefore, differences from the first embodiment will mainly be described below with description regarding common part of the configuration omitted. The same elements as in the first embodiment are assigned the same reference numbers and reference can be made to the preceding description.

In the first embodiment described above, at S90, the processing unit 10 calculates the amplitude estimate amp_est(ch) that corresponds to the maximum amplitude value that the target AD signal can take, based on a superimposed signal acquired by superimposing a plurality of peak components in phase. In the third embodiment, the third embodiment is different from the first embodiment in that, at S90, the processing unit 10 calculates the amplitude estimate amp_est(ch), assuming that the target AD signal is a single-frequency signal.

3-2. Target-AD-Signal Amplitude Estimation

Estimation processing for estimating the amplitude value of the target AD signal performed by the processing unit 10 in the third embodiment will now be described. In the third embodiment, the processing unit 10 calculates a summed power value pow_est(ch) for each reception channel by adding power values at the pairs of bins (p, q) that satisfy the equation (8), using the equation (13). The initial value of the summed power value pow_est(ch) is set to 0, and the summed power value pow_est(ch) is updated a specific number of times, where the specific number is the number of pairs of bins (p, q) that satisfy the equation (8).

$$\text{pow\_est}(ch) \mathrel{+}= \text{ab}(f\,ft(p\_above, q\_above, ch))^2 \quad (13)$$

Assuming that the target AD signal is a single-frequency signal, the processing unit 10 calculates an amplitude value of the single-frequency AD signal equivalent to the summed power value pow_est(ch) as the amplitude estimate amp_est(ch), using the equation (14).

$$\text{amp\_est}(ch) \mathrel{+}= \text{sprt}(2 * \text{pow\_est}(ch))/(MN) \quad (14)$$

In the first embodiment, the amplitude value of the target AD signal is estimated as the amplitude estimate amp_est(ch) when the phases of all the peak components match. In the second embodiment, the amplitude value of the target AD signal is estimated as the amplitude estimate amp_est(ch) when the phases of all the FFT signals included in the target components match. Accordingly, in the first and second embodiments, the amplitude estimate amp_est(ch) is often greater than the actual amplitude value of the target AD signal.

In the third embodiment, assuming that the target AD signal is a single-frequency signal, the processing unit 10 calculates the amplitude value of the single-frequency AD signal equivalent to the summed power value pow_est(ch) as the amplitude estimate amp_est(ch). If one of the plurality of reflected waves observed by the radar device 100 is sufficiently higher than the other reflected signals, the assumption that the AD signal of targets is a single-frequency signal is valid. Typically, the reflected signal received by the radar device 100 is characterized by the fact that one of the plurality of reflected signals is high and the other reflected signals are low. Given the above assumption, the amplitude estimate amp_est(ch) in the third embodiment is more accurately estimated than the amplitude estimates amp_est(ch) in the first and second embodiments.

3-3. Advantages

The third embodiment described above can provide the following advantage in addition to the advantages (1) through (5) of the first embodiment.

(7) If one of the plurality of reflected signals observed by the radar device 100 is sufficiently higher than the other reflected signals, the amplitude of the target AD signal may be estimated accurately, assuming that the target AD signal is a single-frequency signal. The first threshold Th1(ch) can thereby be set accurately.

Fourth Embodiment

4-1. Differences from First Embodiment

A fourth embodiment is similar in basic configuration to the first embodiment. Therefore, differences from the first embodiment will mainly be described below with description regarding common part of the configuration omitted. The same elements as in the first embodiment are assigned the same reference numbers and reference can be made to the preceding description.

In the first embodiment described above, at S90, the processing unit 10 calculates the amplitude estimate amp_est(ch) based on the superimposed signal acquired by superimposing a plurality of peak components in phase. By contrast, the fourth embodiment is different from the first embodiment in that, at S90, all the FFT signals included in the target components are inverse Fourier transformed to calculate the amplitude estimate amp_est(ch).

4-2. Target-AD-Signal Amplitude Estimation

Estimation processing for estimating the amplitude value of the target AD signal performed by the processing unit 10 in the fourth embodiment will now be described. In the fourth embodiment, for each reception channel, the processing unit 10 generates extracted signals fft_above(p, q, ch) acquired by extracting target components from the FFT spectrum, using the equation (15). For each reception channel, the extracted signals fft above(p, q, ch) correspond to signals defined such that the values of the FFT signals at pairs of bins (p, q) where the total power value of FFT signals exceeds the second threshold Th2 are left unchanged and the values of the FFT signals at pairs of bins (p, q) where the total power value of FFT signals are at or below the second threshold Th2 are set to 0. That is, as indicated by the dotted lines in FIG. 14, the FFT signals that exceed the second threshold Th2 are extracted from each of the target components in the amplitude value estimation processing according to the fourth embodiment.

$$\text{fft\_above}(p, q, ch) = f\!f\!t(p, q, ch) \quad (15)$$
$$= 0$$

Figure 15:
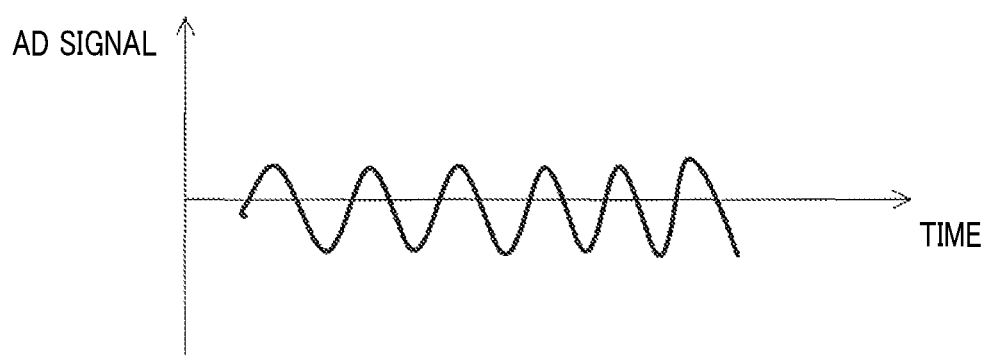
FIG. 15 is an illustration of a target AD signal calculated using a target-signal amplitude estimation method according to the fourth embodiment.

Subsequently, the processing unit 10 calculates the inverse Fourier signals ad_above(m, n, ch) by inverse Fourier transforming the generated extracted signals fft above(p, q, ch) using the equation (16). As illustrated in FIG. 15, the inverse Fourier signals ad_above(m, n, ch) correspond to the AD signals having interference AD signals removed.

$$\text{ad\_above}(m, n, ch) = \frac{1}{MN} \sum_{p=0}^{M-1} \sum_{q=0}^{N-1} \text{fft\_above}(p, q, ch) * e^{j\frac{2\pi m}{M}p} * e^{j\frac{2\pi m}{N}q} \quad (16)$$

Furthermore, as shown in the equation (17), the processing unit 10 calculates, for each reception channel, the maximum value of the inverse Fourier signal ad_above(m, n, ch) with respect to m and n as the amplitude estimate amp_est(ch).

$$\text{amp\_est(ch)}=\max(\text{abs}(\text{add\_above}(m,n,ch))) \quad (17)$$

Calculation of the amplitude estimate amp_est(ch) in the fourth embodiment requires more processing time than calculation of the amplitude estimate amp_est(ch) in each of the first to third embodiments. However, in the fourth embodiment, it is not assumed that all the FFT signals are in phase as in the first and second embodiments. In addition, in the fourth embodiment, it is not assumed that one of the plurality of reflected signals is high and the other reflected signals are low as in the third embodiment. Therefore, the amplitude estimate amp_est(ch) in the fourth embodiment is estimated more accurate than the amplitude estimate amp_est(ch) in each of the first through third embodiments.

4-3. Advantages

The fourth embodiment described above can provide the following advantage in addition to the advantages (1) through (5) of the first embodiment.

(8) The target AD signals having interference AD signals removed from the AD signals are calculated by extracting and inverse Fourier transforming the FFT signals included in the plurality of target components. The first threshold value Th1(ch) can be calculated with high accuracy based on the maximum value among the calculated target AD signals.

Other Embodiments

Although the specific embodiments of the present disclosure have been described above, the present disclosure is not limited to the embodiments described above, and can be implemented in various variations.

(a) The radar device 100 and its method described in the present disclosure may be implemented by a dedicated computer including a processor and a memory programmed to execute one or more functions embodied by computer programs. Alternatively, the radar device 100 and its method described in the present disclosure may be implemented by a dedicated computer including a processor formed of one or more dedicated hardware logic circuits, or may be implemented by one or more dedicated computers including a combination of a processor and a memory programmed to execute one or more functions and a processor formed of one or more dedicated hardware logic circuits. The computer programs may be stored, as instructions to be executed by a computer, in a non-transitory, tangible computer-readable storage medium. The technique for implementing the functions of each part included in the radar device 100 does not necessarily include software, and all of its functions may be implemented using one or more pieces of hardware.

(b) A plurality of functions possessed by one constituent element in the foregoing embodiments may be implemented by a plurality of constituent elements, or one function possessed by one constituent element may be implemented by a plurality of constituent elements. In addition, a plurality of functions possessed by a plurality of constituent elements may be implemented by one constituent element, or one function implemented by a plurality of constituent elements may be implemented by one constituent element. Some of the components in the foregoing embodiments may be omitted. At least some of the components in the foregoing embodiments may be added to or replaced with the other embodiments.

(c) Besides the radar device described above, the present disclosure can be implemented in various modes such as a system including the radar device as a constituent element, a program for causing a computer to serve as the radar device, a non-transitory tangible storage medium, such as a semiconductor memory, storing this program, an interference removal method, and others.

What is claimed is:

1. A radar device comprising:
a transmitting antenna configured to transmit a transmission wave every processing cycle;
a receiving antenna configured to receive a reflected wave of the transmission wave;
a signal acquisition unit configured to acquire an amplitude signal corresponding to the reflected wave received by the receiving antenna;
an interference removing unit configured to remove an interference signal from the amplitude signal acquired by the signal acquisition unit and thereby update the amplitude signal, the interference signal having an amplitude value exceeding a first threshold;
a spectrum acquisition unit configured to acquire a frequency spectrum by Fourier transforming the amplitude signal;
a target extraction unit configured to extract at least one target component exceeding a set second threshold from the frequency spectrum acquired by the spectrum acquisition unit; and
a first threshold calculation unit configured to calculate the first threshold using the at least one target component extracted by the target extraction unit.

2. The radar device according to claim 1, wherein
the interference removing unit is configured to use the first threshold calculated by the first threshold calculation unit in a processing cycle prior to a current processing cycle.

3. The radar device according to claim 1, further comprising
a rise determination unit configured to determine whether there is a rise in noise power in the frequency spectrum acquired by the spectrum acquisition unit, wherein
the interference removing unit is configured to update the amplitude signal in response to the rise determination unit determining that there is a rise in noise power.

4. The radar device according to claim 3, wherein
the interference removing unit is configured to update the amplitude signal in response to the rise determination unit determining that there is a rise in noise power in an immediately previous processing cycle.

5. The radar device according to claim 1, wherein
the interference removing unit is configured to replace, in the amplitude signal, the interference signal to be removed with a signal having an amplitude value equal in magnitude to the first threshold.

6. The radar device according to claim 1, further comprising
a peak extraction unit configured to extract at least one peak component from the at least one target component extracted by the target extraction unit, wherein
the first threshold calculation unit is configured to calculate the first threshold based on a superimposed signal that corresponds to a signal acquired by superimposing the at least one peak component extracted by the peak extraction unit in phase.

7. The radar device according to claim 1, wherein
the first threshold calculation unit is configured to calculate the first threshold based on a superimposed signal that corresponds to a signal acquired by superimposing the at least one target component extracted by the target extraction unit in phase.

8. The radar device according to claim 1, wherein the first threshold calculation unit is configured to calculate the first threshold based on total power of the at least one target component extracted by the target extraction unit.

9. The radar device according to claim 1, further comprising
a transformation unit configured to inverse Fourier transform the at least one target component extracted by the target extraction unit to calculate an inverse Fourier signal, wherein
the first threshold calculation unit is configured to calculate the first threshold based on a maximum value of the inverse Fourier signal calculated by the transformation unit.

10. A radar device comprising:
a transmitting antenna configured to transmit a transmission wave every processing cycle;
a receiving antenna configured to receive a reflected wave of the transmission wave;
a non-transitory memory storing one or more computer programs;
a processor executing the one or more programs to:
acquire an amplitude signal corresponding to the reflected wave received by the receiving antenna;
remove an interference signal from the amplitude signal acquired and thereby update the amplitude signal, the interference signal having an amplitude value exceeding a first threshold;
acquire a frequency spectrum by Fourier transforming the amplitude signal;
extract at least one target component exceeding a set second threshold from the frequency spectrum acquired; and
calculate the first threshold using the at least one target component extracted.

* * * * *